(12) United States Patent
Trotta

(10) Patent No.: US 10,901,497 B2
(45) Date of Patent: *Jan. 26, 2021

(54) SYSTEM AND METHOD OF GESTURE DETECTION FOR A REMOTE DEVICE

(71) Applicant: Infineon Technologies AG, Neubiberg (DE)

(72) Inventor: Saverio Trotta, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/580,373

(22) Filed: Sep. 24, 2019

(65) Prior Publication Data
US 2020/0019235 A1    Jan. 16, 2020

Related U.S. Application Data

(63) Continuation of application No. 15/401,598, filed on Jan. 9, 2017, now Pat. No. 10,466,772.

(51) Int. Cl.
*G06F 3/01* (2006.01)
*H04W 4/70* (2018.01)
(Continued)

(52) U.S. Cl.
CPC ............ *G06F 3/011* (2013.01); *B60R 16/037* (2013.01); *B60R 25/01* (2013.01);
(Continued)

(58) Field of Classification Search
CPC . B60R 16/037; B60R 2325/205; B60R 25/01; B60R 25/2045; B60R 25/245;
(Continued)

(56) References Cited

U.S. PATENT DOCUMENTS

| 4,241,347 A | 12/1980 | Albanese et al. |
| 6,147,572 A | 11/2000 | Kaminski et al. |

(Continued)

FOREIGN PATENT DOCUMENTS

| CN | 1463161 A | 12/2003 |
| CN | 1716695 A | 1/2006 |

(Continued)

OTHER PUBLICATIONS

Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.

(Continued)

*Primary Examiner* — Richard J Hong
(74) *Attorney, Agent, or Firm* — Slater Matsil, LLP

(57) ABSTRACT

A method for operating a mobile device includes detecting a gesture by the mobile device. Detecting the gesture includes receiving a reflected millimeter wave signal by the mobile device, generating a first message in accordance with the detected gesture, and transmitting the first message from the mobile device to an external remote device. The detected gesture is associated with an operation of the remote device.

20 Claims, 13 Drawing Sheets

(51) Int. Cl.
  *H04W 12/00*   (2009.01)
  *B60R 16/037*  (2006.01)
  *B60R 25/01*   (2013.01)
  *B60R 25/20*   (2013.01)
  *B60R 25/24*   (2013.01)

(52) U.S. Cl.
  CPC ........ B60R 25/2045 (2013.01); B60R 25/245 (2013.01); G06F 3/017 (2013.01); H04W 4/70 (2018.02); H04W 12/003 (2019.01); *B60R 2325/205* (2013.01)

(58) Field of Classification Search
  CPC ....... C07D 235/32; G06F 3/011; G06F 3/017; G06F 3/016; H04W 12/003; H04W 4/70; H04N 7/186; G06K 9/78; G01S 13/66; G01S 7/35; G06N 3/0454
  See application file for complete search history.

(56) References Cited

U.S. PATENT DOCUMENTS

| | | | |
|---|---|---|---|
| 6,414,631 B1 | 7/2002 | Fujimoto | |
| 6,636,174 B2 | 10/2003 | Arikan et al. | |
| 7,048,973 B2 | 5/2006 | Sakamoto et al. | |
| 7,057,564 B2 | 6/2006 | Tsai et al. | |
| 7,171,052 B2 | 1/2007 | Park | |
| 7,317,417 B2 | 1/2008 | Arikan et al. | |
| 7,596,241 B2 | 9/2009 | Rittscher et al. | |
| 7,692,574 B2 | 4/2010 | Nakagawa | |
| 7,873,326 B2 | 1/2011 | Sadr | |
| 7,889,147 B2 | 2/2011 | Tam et al. | |
| 8,228,382 B2 | 7/2012 | Pattikonda | |
| 8,497,805 B2 | 7/2013 | Rofougaran et al. | |
| 8,659,369 B2 | 2/2014 | Rofougaran et al. | |
| 8,731,502 B2 | 5/2014 | Salle et al. | |
| 8,836,596 B2 | 9/2014 | Richards et al. | |
| 8,847,814 B2 | 9/2014 | Himmelstoss et al. | |
| 8,860,532 B2 | 10/2014 | Gong et al. | |
| 8,976,061 B2 | 3/2015 | Chowdhury | |
| 9,172,132 B2 | 10/2015 | Kam et al. | |
| 9,202,105 B1 | 12/2015 | Wang et al. | |
| 9,413,079 B2 | 8/2016 | Kamgaing et al. | |
| 9,495,600 B2 | 11/2016 | Heu et al. | |
| 10,503,883 B1* | 12/2019 | Gillian | G01S 13/66 |
| 2003/0179127 A1 | 9/2003 | Wienand | |
| 2004/0238857 A1 | 12/2004 | Beroz et al. | |
| 2006/0001572 A1 | 1/2006 | Gaucher et al. | |
| 2006/0049995 A1 | 3/2006 | Imaoka et al. | |
| 2006/0067456 A1 | 3/2006 | Ku et al. | |
| 2007/0210959 A1 | 9/2007 | Herd et al. | |
| 2008/0106460 A1 | 5/2008 | Kurtz et al. | |
| 2008/0238759 A1 | 10/2008 | Carocari et al. | |
| 2008/0291115 A1 | 11/2008 | Doan et al. | |
| 2008/0308917 A1 | 12/2008 | Pressel et al. | |
| 2009/0073026 A1 | 3/2009 | Nakagawa | |
| 2009/0085815 A1 | 4/2009 | Jakab et al. | |
| 2009/0153428 A1 | 6/2009 | Rofougaran et al. | |
| 2009/0315761 A1 | 12/2009 | Walter et al. | |
| 2010/0207805 A1 | 8/2010 | Haworth | |
| 2011/0299433 A1 | 12/2011 | Darabi et al. | |
| 2012/0087230 A1 | 4/2012 | Guo et al. | |
| 2012/0092284 A1 | 4/2012 | Rofougaran et al. | |
| 2012/0116231 A1 | 5/2012 | Liao et al. | |
| 2012/0195161 A1 | 8/2012 | Little et al. | |
| 2012/0206339 A1 | 8/2012 | Dahl | |
| 2012/0280900 A1 | 11/2012 | Wang et al. | |
| 2012/0296567 A1 | 11/2012 | Breed | |
| 2013/0027240 A1 | 1/2013 | Chowdhury | |
| 2013/0106673 A1 | 5/2013 | McCormack et al. | |
| 2013/0261871 A1 | 10/2013 | Hobbs et al. | |
| 2014/0004793 A1 | 1/2014 | Bandyopadhyay et al. | |
| 2014/0028542 A1 | 1/2014 | Lovitt et al. | |
| 2014/0070994 A1 | 3/2014 | Schmalenberg et al. | |
| 2014/0145883 A1 | 5/2014 | Baks et al. | |
| 2014/0222253 A1 | 8/2014 | Siegel et al. | |
| 2014/0324888 A1 | 10/2014 | Xie et al. | |
| 2015/0117862 A1 | 4/2015 | Trotta et al. | |
| 2015/0181840 A1 | 7/2015 | Tupin, Jr. et al. | |
| 2015/0185314 A1* | 7/2015 | Corcos | G01S 7/35 |
| | | | 342/200 |
| 2015/0185316 A1 | 7/2015 | Rao et al. | |
| 2015/0212198 A1 | 7/2015 | Nishio et al. | |
| 2015/0243575 A1 | 8/2015 | Strothmann et al. | |
| 2015/0277569 A1 | 10/2015 | Sprenger et al. | |
| 2015/0325925 A1 | 11/2015 | Kamgaing et al. | |
| 2015/0346820 A1 | 12/2015 | Poupyrev et al. | |
| 2015/0348821 A1 | 12/2015 | Iwanaga et al. | |
| 2015/0364816 A1 | 12/2015 | Murugan et al. | |
| 2016/0018511 A1 | 1/2016 | Nayyar et al. | |
| 2016/0041617 A1 | 2/2016 | Poupyrev | |
| 2016/0041618 A1 | 2/2016 | Poupyrev | |
| 2016/0061942 A1 | 3/2016 | Rao et al. | |
| 2016/0061947 A1 | 3/2016 | Patole et al. | |
| 2016/0098089 A1 | 4/2016 | Poupyrev | |
| 2016/0103213 A1 | 4/2016 | Ikram et al. | |
| 2016/0109566 A1 | 4/2016 | Liu et al. | |
| 2016/0118353 A1 | 4/2016 | Ahrens et al. | |
| 2016/0146931 A1 | 5/2016 | Rao et al. | |
| 2016/0146933 A1 | 5/2016 | Rao et al. | |
| 2016/0187462 A1 | 6/2016 | Altus et al. | |
| 2016/0191232 A1 | 6/2016 | Subburaj et al. | |
| 2016/0240907 A1 | 8/2016 | Haroun | |
| 2016/0249133 A1 | 8/2016 | Sorensen | |
| 2016/0252607 A1 | 9/2016 | Saboo et al. | |
| 2016/0259037 A1* | 9/2016 | Molchanov | G06K 9/78 |
| 2016/0266233 A1 | 9/2016 | Mansour | |
| 2016/0269815 A1 | 9/2016 | Liao et al. | |
| 2016/0291130 A1 | 10/2016 | Ginsburg et al. | |
| 2016/0299215 A1 | 10/2016 | Dandu et al. | |
| 2016/0306034 A1 | 10/2016 | Trotta et al. | |
| 2016/0320852 A1 | 11/2016 | Poupyrev | |
| 2016/0320853 A1 | 11/2016 | Lien et al. | |
| 2016/0327633 A1 | 11/2016 | Kumar et al. | |
| 2016/0334502 A1 | 11/2016 | Ali et al. | |
| 2016/0349845 A1* | 12/2016 | Poupyrev | G06F 3/016 |
| 2016/0364009 A1* | 12/2016 | Lemberger | G06F 3/017 |
| 2017/0033062 A1 | 2/2017 | Liu et al. | |
| 2017/0045607 A1 | 2/2017 | Bharadwaj et al. | |
| 2017/0052618 A1 | 2/2017 | Lee et al. | |
| 2017/0054449 A1 | 2/2017 | Mani et al. | |
| 2017/0060254 A1* | 3/2017 | Molchanov | G06N 3/0454 |
| 2017/0070952 A1 | 3/2017 | Balakrishnan et al. | |
| 2017/0074974 A1 | 3/2017 | Rao et al. | |
| 2017/0074980 A1 | 3/2017 | Adib et al. | |
| 2017/0077765 A1 | 3/2017 | Bell et al. | |
| 2017/0090014 A1 | 3/2017 | Subburaj et al. | |
| 2017/0090015 A1 | 3/2017 | Breen et al. | |
| 2017/0102457 A1 | 4/2017 | Li et al. | |
| 2017/0115377 A1 | 4/2017 | Giannini et al. | |
| 2017/0131395 A1 | 5/2017 | Reynolds et al. | |
| 2017/0139036 A1 | 5/2017 | Nayyar et al. | |
| 2017/0150298 A1 | 5/2017 | Bandyopadhyay et al. | |
| 2017/0170947 A1 | 6/2017 | Yang | |
| 2017/0176574 A1 | 6/2017 | Eswaran et al. | |
| 2017/0192847 A1 | 7/2017 | Rao et al. | |
| 2017/0201019 A1 | 7/2017 | Trotta | |
| 2017/0212597 A1 | 7/2017 | Mishra | |
| 2017/0332055 A1* | 11/2017 | Henderson | H04N 7/186 |
| 2017/0364160 A1 | 12/2017 | Malysa et al. | |
| 2018/0046255 A1 | 2/2018 | Rothera et al. | |
| 2018/0101239 A1 | 4/2018 | Yin et al. | |
| 2018/0373340 A1 | 12/2018 | Cheng et al. | |

FOREIGN PATENT DOCUMENTS

| | | |
|---|---|---|
| CN | 101490578 A | 7/2009 |
| CN | 101585361 A | 11/2009 |
| CN | 102788969 A | 11/2012 |
| CN | 102967854 A | 3/2013 |
| CN | 103529444 A | 1/2014 |
| CN | 203950036 U | 11/2014 |
| CN | 105607745 A | 5/2016 |
| DE | 102008054570 A1 | 6/2010 |

(56) References Cited

FOREIGN PATENT DOCUMENTS

| | | |
|---|---|---|
| DE | 102011075725 A1 | 11/2012 |
| DE | 102014118063 A1 | 7/2015 |
| GB | 2247799 A | 3/1992 |
| JP | 2001174539 A | 6/2001 |
| JP | 2004198312 A | 7/2004 |
| JP | 2006234513 A | 9/2006 |
| JP | 2008029025 A | 2/2008 |
| JP | 2008089614 A | 4/2008 |
| JP | 2009069124 A | 4/2009 |
| JP | 2011529181 A | 12/2011 |
| JP | 2012112861 A | 6/2012 |
| JP | 2013521508 A | 6/2013 |
| JP | 2014055957 A | 3/2014 |
| KR | 20090063166 A | 6/2009 |
| KR | 20140080101 A | 6/2014 |
| KR | 20140082815 A | 7/2014 |
| WO | 2007060069 A1 | 5/2007 |
| WO | 2013009473 A2 | 1/2013 |
| WO | 2016033361 A1 | 3/2016 |

OTHER PUBLICATIONS

Chuanhua, Du, "FMCW Radar Range-Doppler Processing and Beam Formation Technology", Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.

Deacon, Peter et al., "Frequency Modulated Continuous Wave (FMCW) Radar", Design Team 6 Technical Lecture, Nov. 9, 2011, 27 pages.

Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.

Dooring Alert Systems, "Riders Matter", http:\\dooringalertsystems.com, printed Oct. 4, 2017, 16 pages.

Filippelli, Mario et al., "Respiratory dynamics during laughter", J Appl Physiol, (90), 1441-1446, Apr. 2001, http://iap.physiology.org/content/jap/90/4/1441.full.pdf.

Fox, Ben, "The Simple Technique That Could Save Cyclists' Lives", https://www.outsideonline.com/2115116/simple-technique-could-save-cyclists-lives, Sep. 19, 2016, 6 pages.

Gu, Changzhan et al., "Assessment of Human Respiration Patterns via Noncontact Sensing Using Doppler Multi-Radar System", Sensors, Mar. 2015, 15(3), 6383-6398, doi: 10.3390/s150306383, 17 pages.

Guercan, Yalin "Super-resolution Algorithms for Joint Range-Azimuth-Doppler Estimation in Automotive Radars", Technische Universitet Delft, TUDelft University of Technology Challenge the Future, Jan. 25, 2017, 72 pages.

Inac, Ozgur et al., "A Phased Array RFIC with Built-In Self-Test Capabilities", IEEE Transactions on Microwave Theory and Techniques, vol. 60, No. 1, Jan. 2012, 10 pages.

Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.

Kuehnke, Lutz, "Phased Array Calibration Procedures Based on Measured Element Patterns", 2001 Eleventh International Conference on Antennas and Propagation, IEEE Conf., Publ. No. 480, Apr. 17-20, 2001, 4 pages.

Lim, Soo-Chul et al., "Expansion of Smartwatch Touch Interface from Touchscreen to Around Device Interface Using Infrared Line Image Sensors", Sensors 2015, ISSN 1424-8220, vol. 15, 16642-16653, doi:10.3390/s150716642, www.mdpi.com/journal/sensors, Jul. 15, 2009, 12 pages.

Lin, Jau-Jr et al., "Design of an FMCW radar baseband signal processing system for automotive application", SpringerPlus a SpringerOpen Journal, (2016) 5:42, http://creativecommons.org/licenses/by/4.0/, DOI 10.1186/s40064-015-1583-5; Jan. 2016, 16 pages.

Microwave Journal Frequency Matters, "Single-Chip 24 GHz Radar Front End", Infineon Technologies AG, www.microwavejournal.com/articles/print/21553-single-chip-24-ghz-radar-front-end, Feb. 13, 2014, 2 pages.

Schroff, Florian et al., "FaceNet: A Unified Embedding for Face Recognition and Clustering", CVF, CVPR2015, IEEE Computer Society Conference on Computer Vision and Pattern Recognition, Mar. 12, 2015, pp. 815-823.

Simon, W., et al., "Highly Integrated KA-Band Tx Frontend Module Including 8×8 Antenna Array", IMST GmbH, Germany, Asia Pacific Microwave Conference, Dec. 7-10, 2009, 63 pages.

Suleymanov, Suleyman, "Design and Implementation of an FMCW Radar Signal Processing Module for Automotive Applications", Master Thesis, University of Twente, Aug. 31, 2016, 61 pages.

Thayananthan, T. et al., "Intelligent target recognition using micro-Doppler radar signatures", Defence R&D Canada, Radar Sensor Technology III, Proc. of SPIE, vol. 7308, 730817, Dec. 9, 2009, 11 pages.

Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.

Wilder, Carol N., et al., "Respiratory patterns in infant cry", Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.

Xin, Qin et al., "Signal Processing for Digital Beamforming FMCW SAR", Hindawi Publishing Corporation, Mathematical Problems in Engineering, vol. 2014, Article ID 859890, http://dx.doi.org/10.1155/2014/859890, 11 pages.

Liming, Gong "Interpretation on NVIDIA's RADA Gesture Recognition to Have a Full Picture of Project Soli", CSDN, Jun. 12, 2016, 15 pages.

* cited by examiner

| Gesture Appearance | Gesture Name | Function |
|---|---|---|
|  | Gesture 1 | Set air conditioning |
|  | Gesture 2 | Switch on seat heating |
|  | Gesture 3 | Open the car trunk |
|  | Gesture 4 | Close the car trunk |
|  | Gesture 5 | Switch on the light |
|  | Gesture 6 | Start an emergency call | ns # SYSTEM AND METHOD OF GESTURE DETECTION FOR A REMOTE DEVICE

This application is a continuation of U.S. patent application Ser. No. 15/401,598, filed on Jan. 9, 2017, which application is hereby incorporated herein by reference.

TECHNICAL FIELD

This disclosure relates in general to a system and method for gesture detection, and, in particular embodiments, to a system and method of gesture detection for a remote device.

BACKGROUND

The future Internet of Things (IoT) will feature the internetworking of physical devices, vehicles, buildings and other "things" embedded with electronics, software, sensors, actuators, and/or network connectivity that enable these objects to collect and exchange data. The IoT will allow objects to be sensed and/or controlled remotely across existing network infrastructure, creating opportunities for more direct integration of the physical world into computer-based systems, and resulting in improved efficiency, accuracy and economic benefit.

Each connected thing in the future IoT may be uniquely identifiable through its embedded computing system but still able to interoperate within the existing Internet infrastructure. Experts estimate that the IoT will consist of almost 50 billion objects by 2020.

This burgeoning IoT will feature an ever-widening focus on machine-to-machine (M2M) communication. In such a world where physical objects are more networked than ever and will be having their own conversations around us, questions remain about what the future will hold for human-to-machine (H2M) communication. Human participants may feel increasingly disembodied as they stare at diminutive displays, manipulate their fingers across glass surfaces with unnatural swiping, spreading, and pinching motions, and read automated social media messages created by software applications.

SUMMARY

In accordance with a first example embodiment of the present invention, a method for operating a mobile device is provided. The method includes detecting a gesture by the mobile device. Detecting the gesture includes receiving a reflected millimeter wave signal by the mobile device, generating a first message in accordance with the detected gesture, and transmitting the first message from the mobile device to an external remote device. The detected gesture is associated with an operation of the remote device.

In accordance with a second example embodiment of the present invention, a method for operating a first device is provided. The method includes receiving, by the first device from an external mobile device, a first message generated using millimeter wave radar signaling in a field of view of the mobile device. The method also includes processing, by the first device, the first message to detect a gesture associated with an operation of the first device, and performing, by the first device, an operation in accordance with the detected gesture.

In accordance with a third example embodiment of the present invention, a control circuit for a first device is provided. The circuit includes a receiver configured to receive, from an external mobile device, a first message including radar data generated using millimeter wave radar signaling in a field of view of the mobile device. The circuit also includes a processor and a non-transitory computer readable medium storing programming for execution by the processor. The programming includes instructions to process the first message to detect a gesture associated with an operation of the first device, and to perform the operation of the first device in accordance with the detected gesture.

BRIEF DESCRIPTION OF THE DRAWINGS

For a more complete understanding of the disclosure, reference is now made to the following descriptions taken in conjunction with the accompanying drawings, in which.

DETAILED DESCRIPTION OF ILLUSTRATIVE EMBODIMENTS

Figure 1:
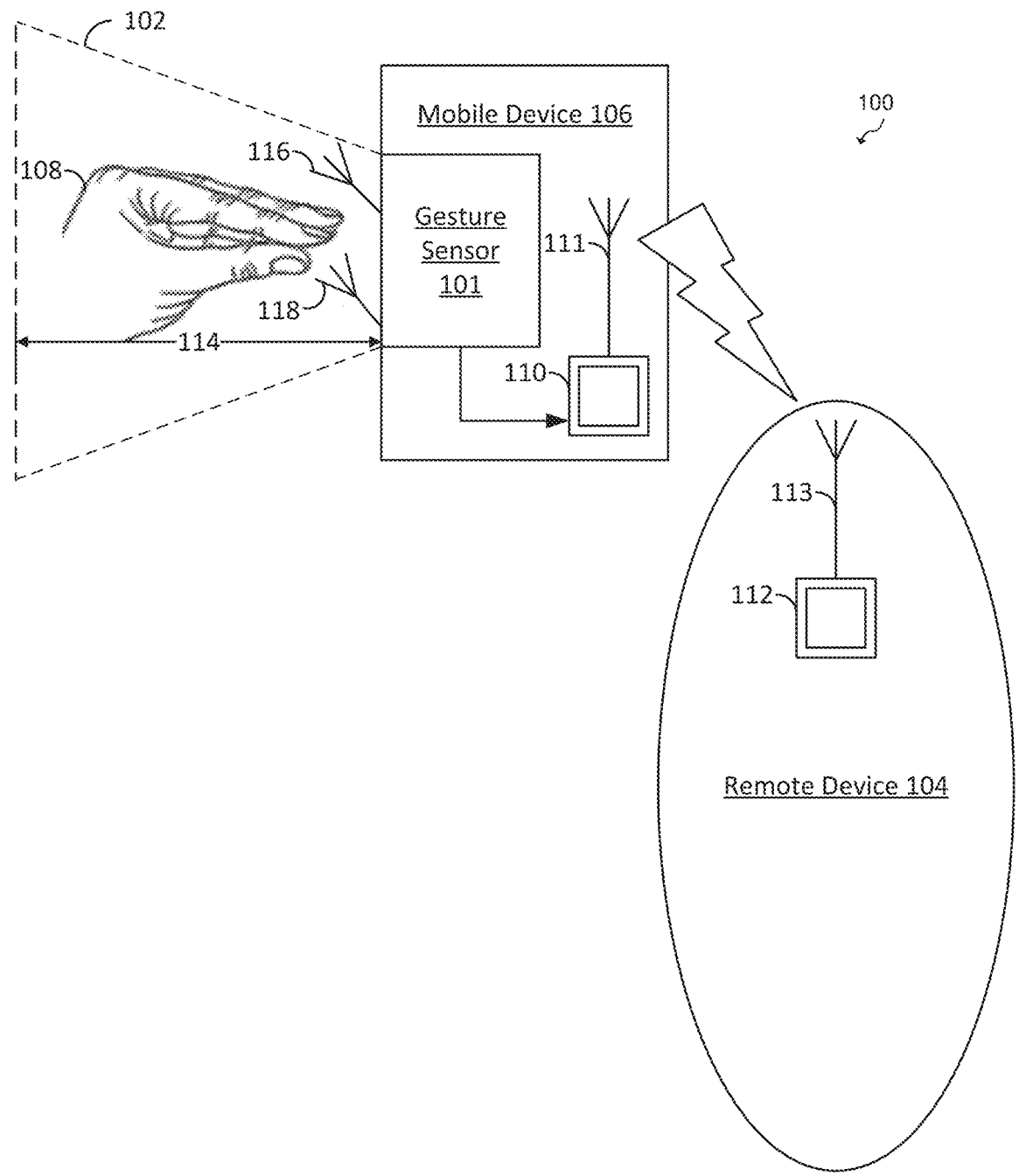
FIG. 1 is a block diagram illustrating a gesture detection system in accordance with one of a number of embodiments.

The making and using of various embodiments are discussed in detail below. It should be appreciated, however, that the disclosure provides many applicable concepts that can be embodied in a wide variety of specific contexts. The specific embodiments discussed are merely illustrative of specific ways to make and use embodiments, and do not limit the scope of the invention.

In various embodiments, a radar-based gesture detection system is used to control a remote device such, as, e.g., a vehicle, a building, a home appliance, etc. For example, when the remote device is a car, an embodiment gesture detection system allows a human participant to control various operations of the car from outside the car while approaching it.

In various embodiments, the gesture detection system includes a gesture sensor built into a mobile device such as, for example, a car key, a wristwatch, a smart phone, etc. In such embodiments, the mobile device may relay either raw radar data or processed control messages to the remote device so that the remote device will perform a desired operation. For example, a thumbs-up hand gesture may be detected by a smart key and relayed to a car, causing the trunk to open. Such a smart key gesture sensor could have a much smaller radar detection range than a hypothetical gesture sensor located in the car, and this smaller detection range would help prevent interfering radar reflections, including interfering gestures, from affecting the proper behavior of the system. As an example, the radar detection range may be reduced to 30 cm or less so that the mobile device may interact only with the intended operator, who could be, e.g., a person wearing the mobile device, holding the mobile device, carrying it in a pants pocket, etc.

In various embodiments, the mobile device could be paired with the remote device via a shared security key, so that data is encrypted for transmission from the mobile device and decrypted at the remote device, and vice versa. The data transfer between the mobile device and remote device could include any of a wide variety of communications technologies, including, e.g., Bluetooth, V2X, etc.

In various embodiments, the gesture detection system may be programmed via a user interface at the remote device, so that an end user is able to assign a remote device operation to each gesture. For example, an alphabet of 6 gestures may be loaded by default in the system, and the end user may be able to select which function to associate to each gesture. Emergency contact information could also be entered and an emergency call function associated with a gesture.

In various embodiments, the gesture recognition may cause sounds to be emitted by the mobile device based on feedback from the remote device. The feedback may indicate, for example, that a hand-shake with the remote device was successful or that a gesture-indicated operation was successfully performed by the remote device. For example, the volume of a sound generated by a smart key may increase as the temperature setting of a car's air conditioning system increases in response to user gestures detected by the smart key.

In an embodiment, the mobile device's radar data may include radar timing and/or frequency information. In an embodiment, the mobile device may process its radar data to detect a gesture. In another embodiment, however, the mobile device may transfer raw radar data over, for example, a large bandwidth connection (e.g., WiFi, WiGig, etc.) so that a processor embedded in the remote device may process the radar data and classify it as a particular gesture.

In various embodiments where the remote device is an automobile, the mobile device could be a smart key such as, e.g., an ignition or vehicle access key that includes a radar-based gesture sensor. The main drawback of such an implementation would be that such a smart key may have a battery with a short battery life. To combat this short battery life, in some embodiments a wireless charging system or other charging system may be built into the cockpit of the vehicle remote device.

FIG. 1 shows an embodiment gesture detection system 100. The gesture detection system 100 includes a mobile device 106 and a remote device 104. The mobile device 106 may be, for example, a car key, a wristwatch, a smart phone, etc. In an embodiment, the remote device is a vehicle, and the mobile device is a vehicle access key and/or a vehicle ignition key.

Referring again to FIG. 1, the mobile device 106 includes a transceiver 110 and antenna 111 that communicate with a transceiver 112 and antenna 113 of the remote device 104. In some embodiments, each of the antenna 111 and the antenna 113 may include multiple arrays of receive and transmit antennas.

Referring again to FIG. 1, the mobile device 106 includes a gesture sensor 101. The gesture sensor 101 includes a radar transmit antenna 116 and a radar receive antenna 118. In an embodiment, the radar transmit antenna 116 and the radar receive antenna 118 are tuned for millimeter-wave frequencies. In some embodiments, each of the radar transmit antenna 116 and the radar receive antenna 118 may include multiple antenna arrays. In other embodiments, any of antennas 111, 116, and 118 may be combined into a single antenna or antenna array.

Referring again to FIG. 1, the gesture sensor 101 has a field of view 102 that features a maximum detection range 114. A gesture such as, e.g., a hand gesture 108 that is made within the field of view 102 is detectable by the gesture sensor 101.

Figure 2:
FIG. 2 is a table illustrating a mapping between gestures and remote device functions in accordance with one of a number of embodiments.
Figure 2:
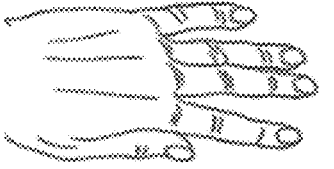
Figure 2:
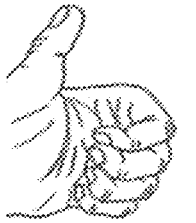
Figure 2:
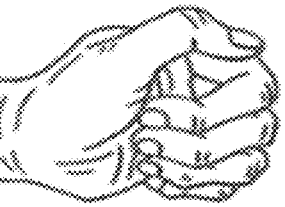
Figure 2:
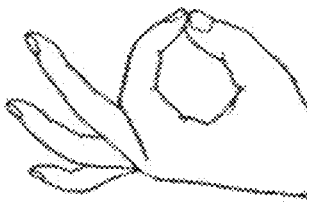
Figure 2:
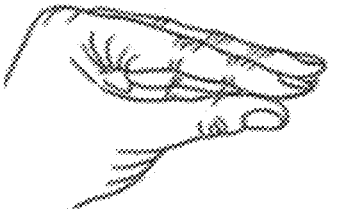

FIG. 2 shows an embodiment mapping 202 between exemplary hand gestures and associated operations that may be performed in an automobile used as the remote device 102. In the embodiment of FIG. 2, a first hand gesture in which the fingers and thumb are pointed forward may be used to set the air conditioning of the car, including, e.g., reducing the temperature. A second gesture in which the hand is held flat may be used to switch on seat heating. A third "thumbs up" gesture may be used to open the car trunk. A fourth hand gesture is a balled fist that may be used to close the car trunk. A fifth hand gesture is an "OK" sign that may be used to switch on the automobile dome light. A sixth hand gesture pinches the thumb to fingers extended forward to start an emergency call. In other embodiments, these and other gestures may be associated with a variety of operations of a remote device, including, for example, turning on the remote device, turning off the remote device, turning a sound system on or off, tuning a radio channel, changing content of a user display, turning an auto-pilot program on or off, turning a voice recognition program on or off, mapping a route, looking up weather, road condition, and/or traffic information, initiating a diagnostic test, enabling or disabling a security system of the remote device, generating a sound and/or a haptic output, etc.

Figure 3A:
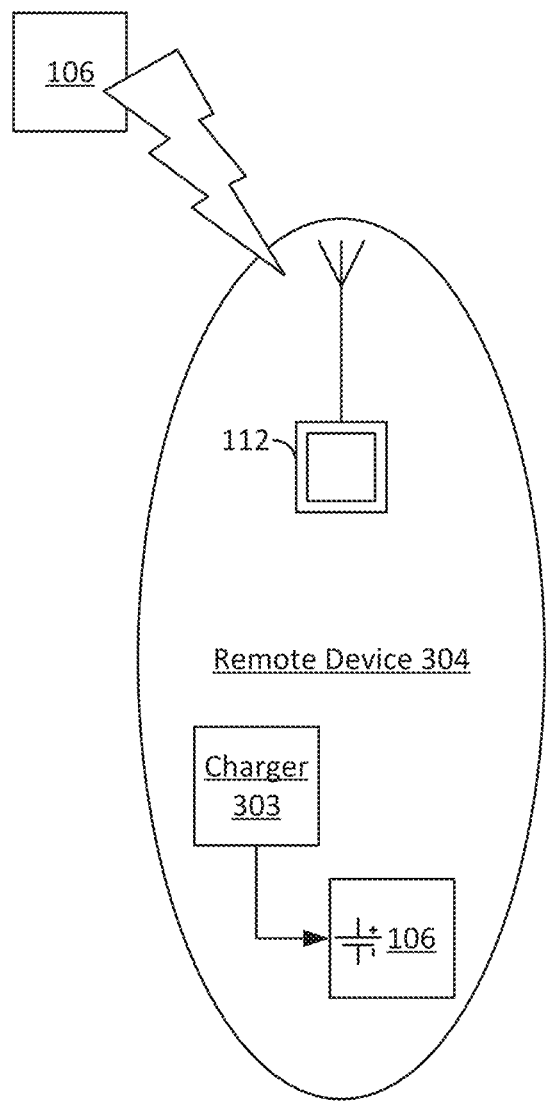
FIG. 3A is a block diagram illustrating charging a mobile device by a remote device in accordance with one of a number of embodiments.
Figure 3B:
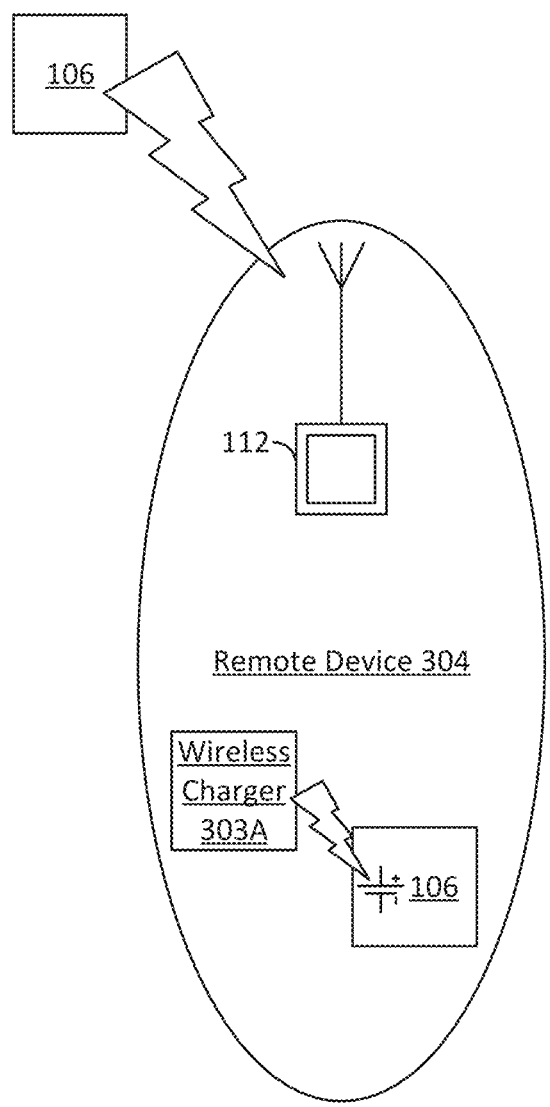
FIG. 3B is a block diagram illustrating wirelessly charging a mobile device by a remote device in accordance with one of a number of embodiments.
Figure 3C:
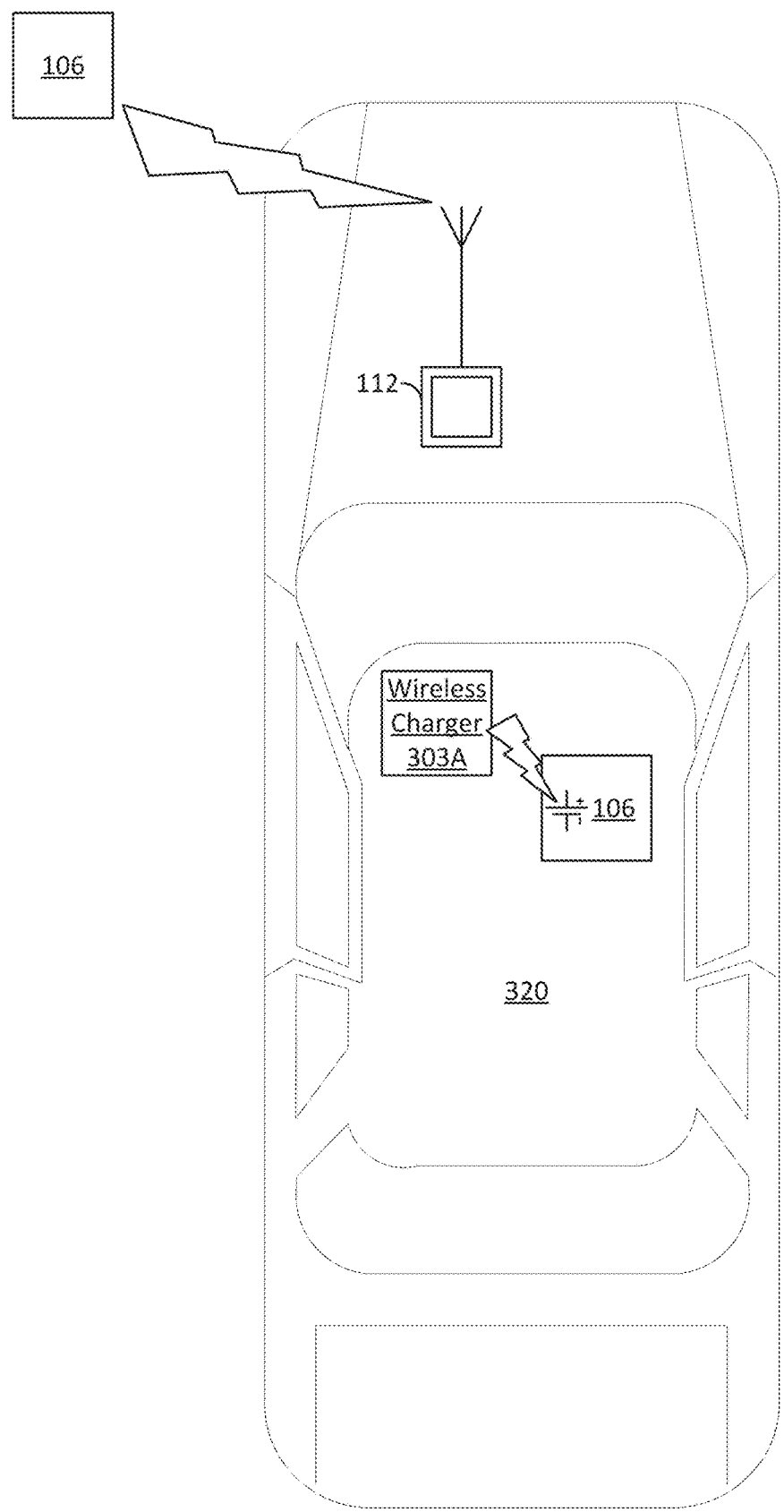
FIG. 3C is a block diagram illustrating an automobile used as the remote device of FIG. 3B.

FIG. 3A shows an embodiment remote device 304 that may be used as the remote device 104 of FIG. 1. Remote device 304 includes a charger 303 that may be used to charge a battery of mobile device 106. The charger 303 may be implemented as, for example, the wireless charger 303A, shown in FIG. 3B. FIG. 3C is a block diagram illustrating an automobile used as the remote device of FIG. 3B.

Figure 4:
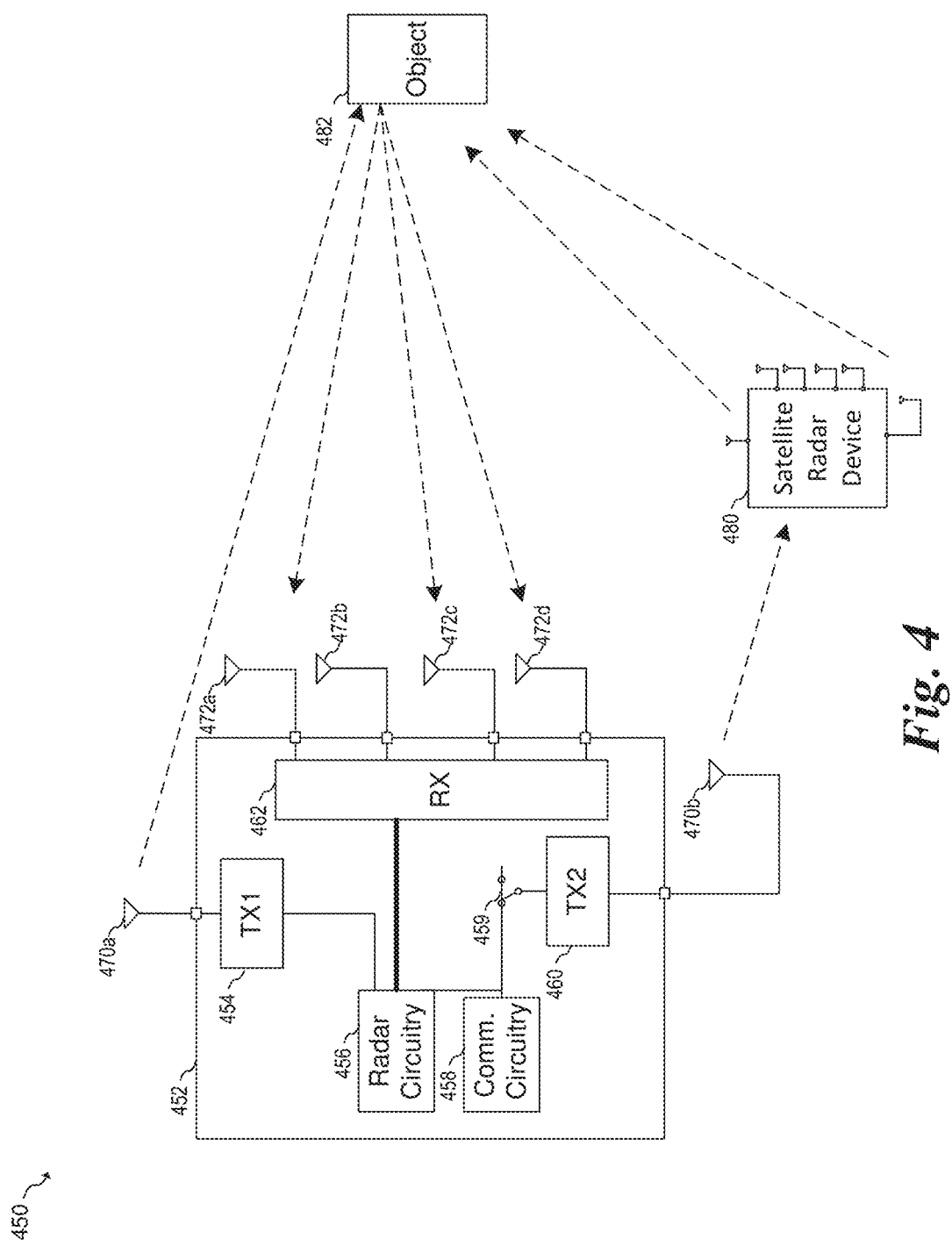
FIG. 4 is a block diagram illustrating a radar system that may be used in the gesture detection system of FIG. 1 in accordance with one of a number of embodiments.

FIG. 4 illustrates an embodiment radar system 450 that may be used in one of a number of embodiments of the gesture sensor 101 of FIG. 1. As shown, radar transceiver device 452 is configured to transmit an incident RF signal toward object 482 via transmit antenna 470a and/or transmit antenna 470b, and receive a reflected RF signal via an antenna array that includes receive antennas 472a-d. Radar transceiver device 452 includes receiver front end 462 coupled to receive antennas 472a-d, first transmitter front end 454 coupled to transmit antenna 470a and second transmitter front end 460 coupled to transmit antenna 470b. Radar circuitry 456 provides signals to be transmitted to first and second transmitter front ends 454 and 460 and receives and/or processes signals received by receiver front end 462.

In an embodiment, the input to second transmitter front end 460 is selectable between an output of radar circuitry 456 and an output of communication circuitry 458 via a circuit represented by switch 459. When second transmitter front end 460 receives input from radar circuitry 456, both first transmitter front end 454 and second transmitter front end 460 can be used to build a holographic radar. On the other hand, when second transmitter front end 460 receives it input from communication circuitry 458, first transmitter front end 454 provides a radar signal to transmit antenna 470a and second transmitter front end 460 provides a communications signal to transmit antenna 470b. This communications signal may be a carrier modulated signal. In one example, the second transmitter front end 460 may transmit a bipolar phase-shift keyed (BPSK) modulated signal to satellite radar device 480 that contains data. In some embodiments, a data link between radar transceiver device 452 and satellite radar device 480 may be used to coordinate RF transmission and reception between radar transceiver device 452 and satellite radar device 480 to implement phase array beam steering. In some embodiments, satellite radar device 480 may also be capable of data transmission and radar transceiver device 452 may be configured to receive data from satellite radar device 480 via antennas 472a-d.

In an embodiment, radar transceiver device 452, or portions of radar transceiver device 452 may be implemented in a package that contains first transmitter front end 454, second transmitter front end 460, receiver front end 462, as well as transmit antennas 470a and 470b and receive antennas 472a-d. In an embodiment, a ball grid array (BGA) package that contains patch antennas may be used to implement antennas 470a, 470b and 472a-d. In alternative embodiments, other antenna elements may be used besides patch antennas, for example, a Yagi-Uda antenna may be used provide sensing from the side of the packaged chip and antenna module.

In an embodiment, the frequency of operation of radar system 450, as well as other embodiments, disclosed in this disclosure, is between about 57 GHz and about 66 GHz. Alternatively, embodiment systems may operate at frequencies outside of this range also. For example, in an embodiment the frequency of operation of radar system 450, as well as other embodiments disclosed in this disclosure, is between about 57 GHz and about 71 GHz.

A millimeter-wave radar-based gesture sensor has been described in U.S. application Ser. No. 14/954,198, filed on Nov. 30, 2015, which application is incorporated herein by reference in its entirety.

Figure 5A:
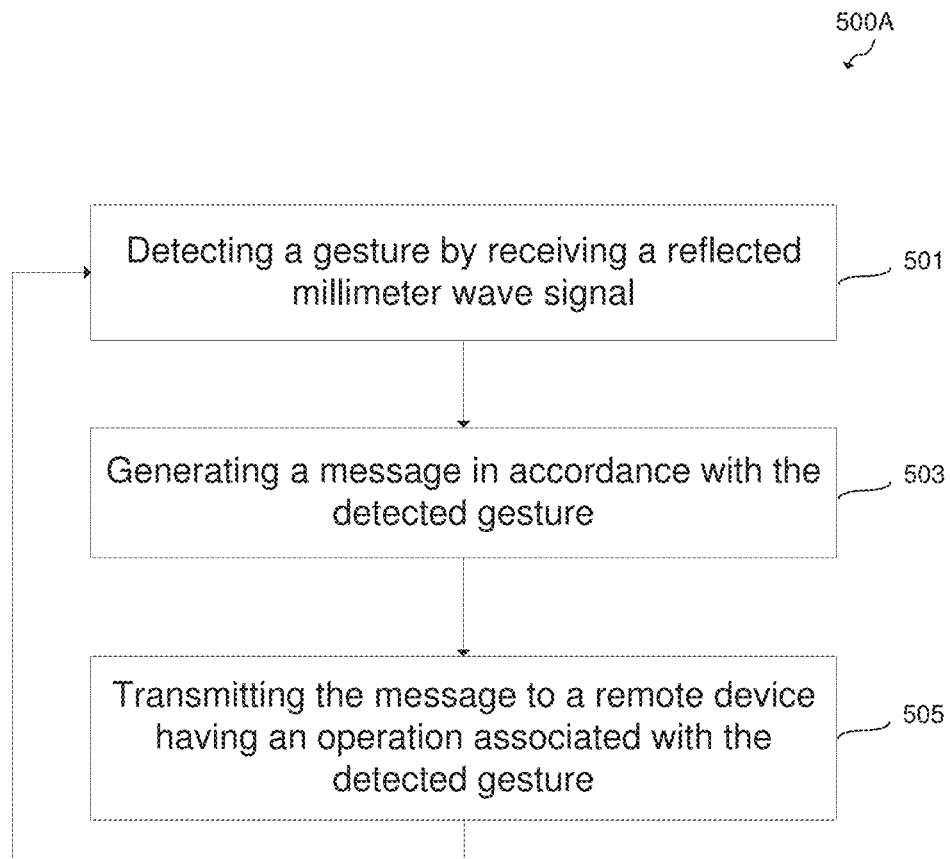
FIG. 5A is a flow diagram illustrating a first method for operating a mobile device in a gesture detection system in accordance with one of a number of embodiments.

FIG. 5A shows an embodiment method 500A for operating a radar-based gesture sensing mobile device such as mobile device 106. The method 500A begins at step 501, where a gesture (e.g., a hand gesture) is detected by the mobile device. In an embodiment, the mobile device detects this gesture by receiving a reflected millimeter wave signal using, for example, an antenna or an array of antennas. At step 503, the mobile device generates a message in accordance with the detected gesture. At step 505, where the mobile device transmits the message to a remote device using, for example, a second antenna, a second array of antennas, the first antenna, etc. A particular operation of the remote device is associated with the gesture detected in step 503, and then flow returns to step 501. In an embodiment where the remote device is a vehicle, the operation associated with the detected gesture may include, for example, setting an air conditioning setting of the vehicle, setting heat seating, opening a trunk of the vehicle, setting a lighting setting, initiating an emergency call, etc.

Figure 5B:
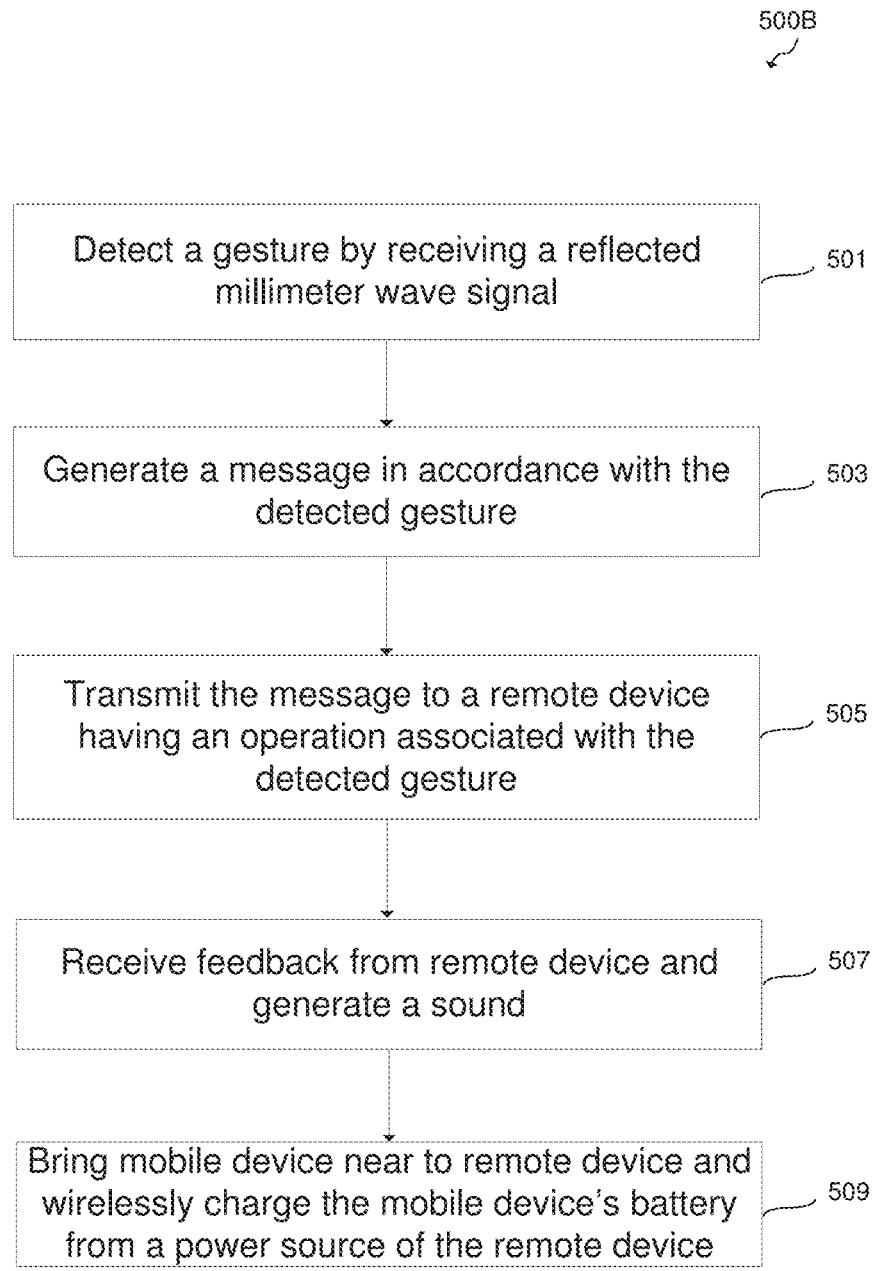
FIG. 5B is a flow diagram illustrating an alternative method for operating a mobile device in a gesture detection system in accordance with one of a number of embodiments.

FIG. 5B shows an embodiment method 500A, which is the same as the embodiment method 500B except that it includes additional steps 507 and 509. At step 507, the mobile device receives feedback from the remote device and generates a sound based on this feedback. The feedback may include, for example, information about whether the remote device successfully performed the operation associated with the detected gesture of step 503. At step 509, the mobile device is brought near to the remote device and wirelessly charges its battery from a power source that is a component of the remote device.

Figure 6:
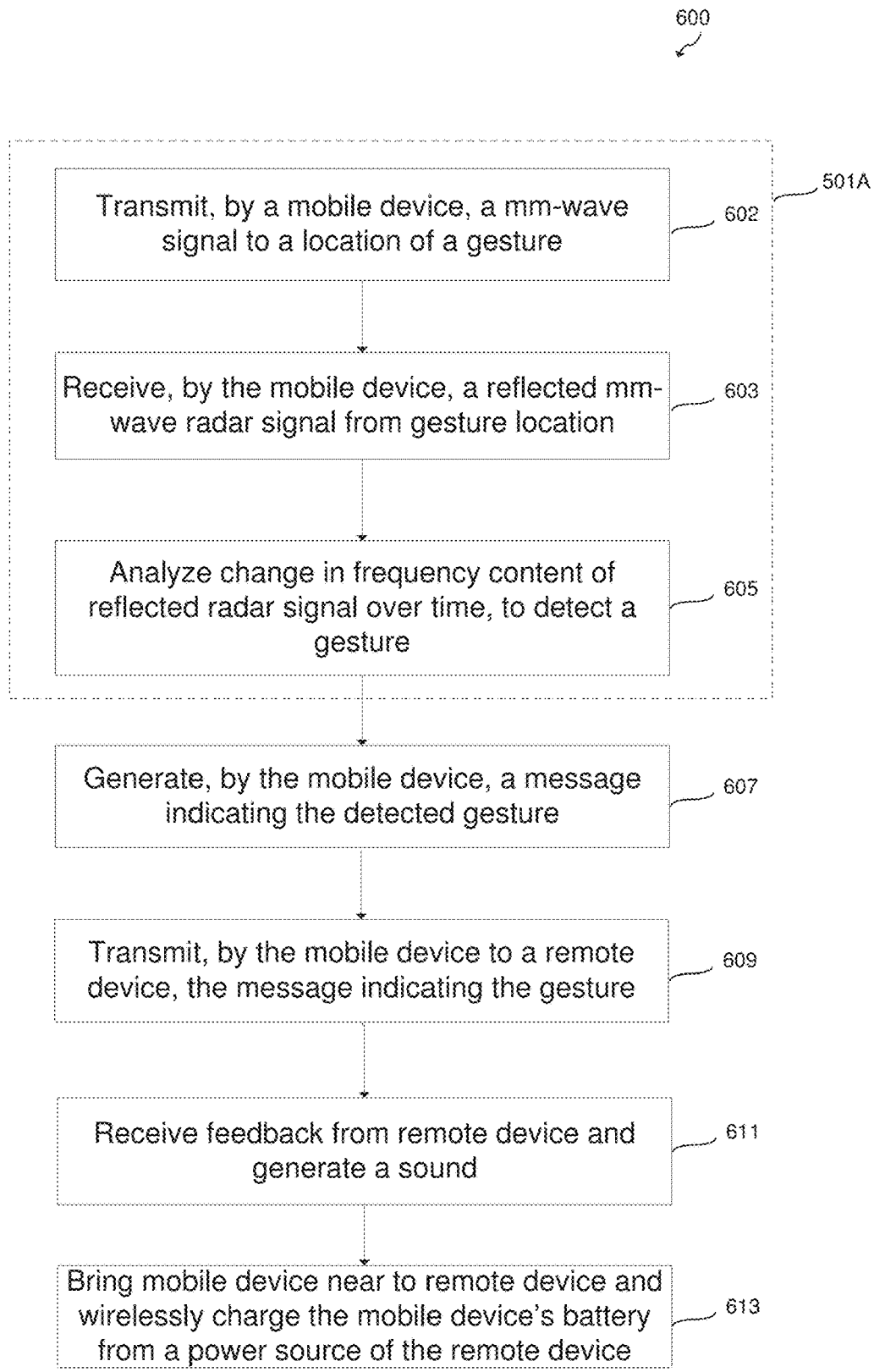
FIG. 6 is a flow diagram illustrating a first implementation of the method of FIG. 5B in greater detail, in accordance with one of a number of embodiments.

FIG. 6 shows an embodiment method that may be used to implement the method 500B of FIG. 5B. Method 600 begins with block 501A, which is an implementation of the mobile device's gesture detection step 501. Block 50A includes steps 602, 603, and 605. At step 602, the mobile device transmits a first millimeter wave signal to a location of the gesture. At step 603, the mobile device receives a reflected millimeter wave radar signal. This reflected millimeter wave signal has been reflected from the location of the gesture. In an embodiment, the gesture is located in a radar detection range of the mobile device that is not greater than 30 centimeters.

Flow continues at step 605, where the mobile device detects which gesture, movement, hand sign, etc. (referred to in this disclosure as a "gesture") has created the radar signal by analyzing the manner in which the frequency content of the radar signal changes over time. In some embodiments, the radar signal is converted in to the frequency domain using transform methods known in the art. These transform methods include, but are not limited to a discrete Fourier transform (DFT), a fast Fourier transform, a short-time Fourier Transform (STFT), and spectrogram analysis. During step 605, multiple transforms may be calculated over a sliding time window and peak frequencies of these multiple transforms may be tracked to analyze how the range Doppler and the velocity of the target change over time. For example, one or more peak frequency vs. time signals may be generated to track how the frequency content of the radar signal changes over time. In various embodiments, each gesture has a specific, pre-determined signature with respect to how the frequency content of the radar signal changes over time. Each gesture has previously been categorized by its associated radar signature and these pre-determined signatures have been stored in a look up table (LUT) in the mobile device. During operation the mobile device verifies if the signal detected by the sensor corresponds to one of the signatures stored in the LUT. By comparing the tracked frequency content of the radar signal with the stored signatures, a received gesture may be determined. Micro-Doppler analysis methods may also be used to analyze the radar signal and classify the gesture in some embodiments.

At step 607, the mobile device generates a first message indicating which gesture has been detected. At step 609, the mobile device transmits this first message to a remote device, such as, e.g., remote device 104 of FIG. 1. In an embodiment, the transmitted message is encrypted by the mobile device using a shared security key that is shared between the mobile device and the remote device.

Referring again to FIG. 6, at step 611, the mobile device receives feedback from the remote device and generates a sound based on this feedback. At step 613, the mobile device is brought near to the remote device and wirelessly charges its battery from a power source that is a component of the remote device.

Figure 7:
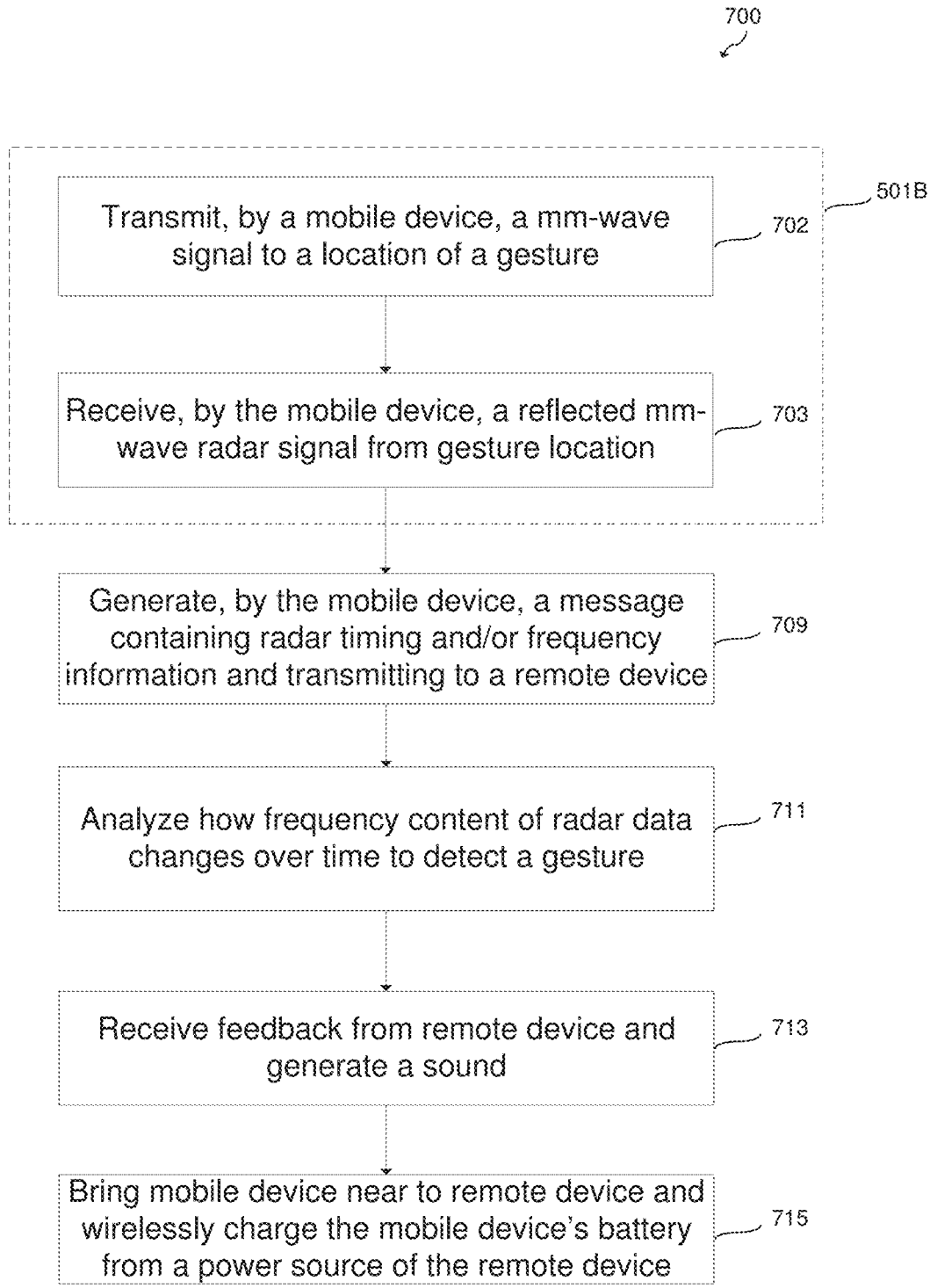
FIG. 7 is a flow diagram illustrating an alternative implementation of the method of FIG. 5B in greater detail, in accordance with one of a number of embodiments.

FIG. 7 shows an alternative embodiment method 700 for operating a mobile device in conjunction with a remote device. Method 700 begins with block 501B, which is an alternative implementation of the mobile device's gesture detection step 501 of FIG. 5. Block 501B includes steps 702 and 703. At step 702, the mobile device transmits a millimeter wave signal to a location of a gesture. At step 703, the mobile device receives a reflected millimeter wave radar signal from the gesture location. At step 709, the mobile device generates a message containing radar timing information and/or radar frequency information and transmits this message to the remote device. At step 711, the remote device analyzes how frequency content of the radar data changes over time to detect a gesture. Each gesture has previously been categorized by its associated radar signature and these pre-determined signatures have been stored in association with an associated remote device operation in an LUT in the remote device. During operation the remote device verifies if the signal detected by the sensor corresponds to one of the signatures stored in the remote device. At step 713, the mobile device receives feedback from the remote device and generates a sound based on this feedback. At step 715, the mobile device is brought near to the remote device and wirelessly charges its battery from a power source that is a component of the remote device.

Figure 8A:
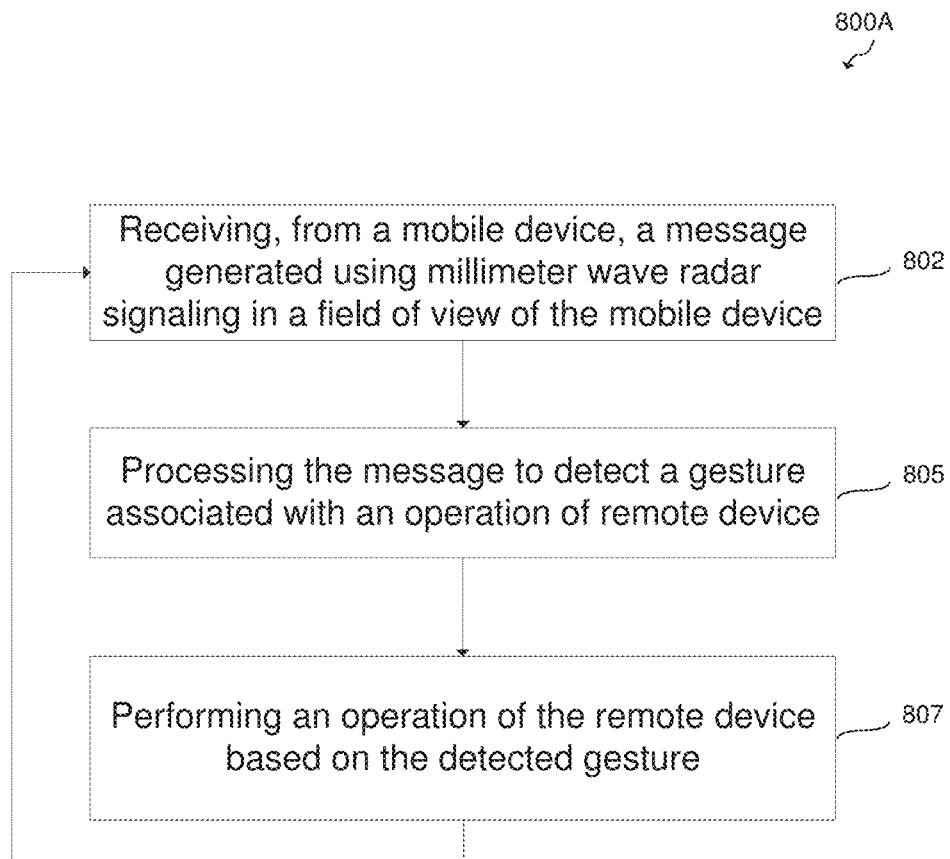
FIG. 8A is a flow diagram illustrating a first method for operating a remote device in a gesture detection system in accordance with one of a number of embodiments.

FIG. 8A shows an embodiment method 800A for operating a remote device such as, e.g., remote device 104 of FIG. 1. Method 800A begins with step 802, where the remote device receives a message from a mobile device. The message has been generated by the remote device using millimeter wave radar signaling in a field of view of the mobile device. In an embodiment, the remote device is a vehicle and the mobile device is a vehicle access key and/or a vehicle ignition key. At step 805, the remote device processes the received message to detect a gesture associated with an operation of the remote device. In an embodiment, the received message includes radar data, which the remote device processes by analyzing frequency content of the radar data to detect the gesture. Each gesture has previously been categorized by its associated radar signature and these pre-determined signatures have been stored in association with an associated remote device operation in an LUT in the remote device. During operation the remote device verifies if the signal detected by the sensor corresponds to one of the signatures stored in the remote device. At step 807, the remote device performs the associated operation based on the detected gesture. Flow then returns to step 801.

Figure 8B:
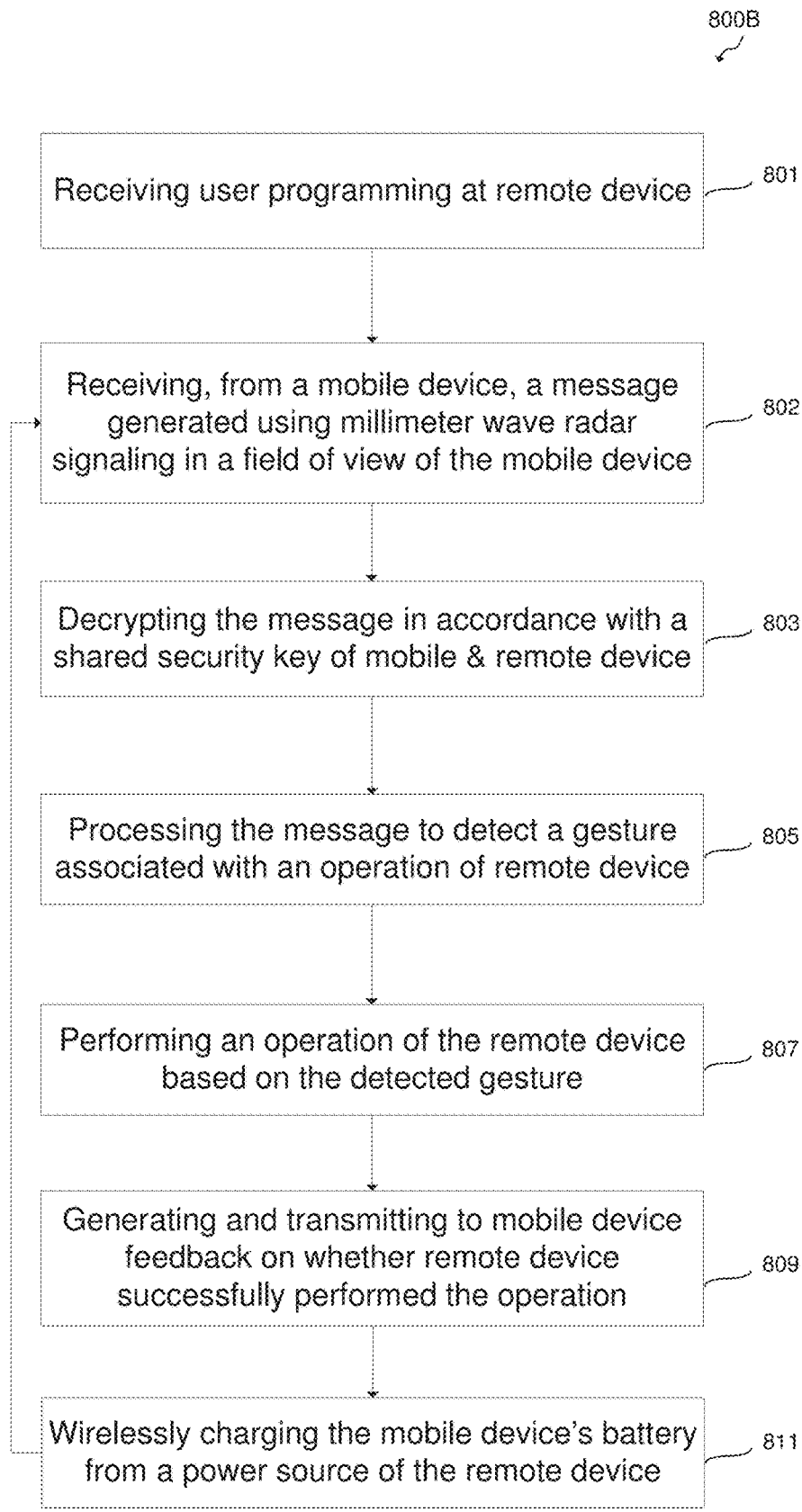
FIG. 8B is a flow diagram illustrating an alternative method for operating a remote device in a gesture detection system in accordance with one of a number of embodiments.

FIG. 8B shows an embodiment method 800B that is the same as method 80A except that it begins with an additional step 801 and ends with additional steps 809 and 811. At step 801, the remote device receives user input to program the remote device. As a first example, the user input includes emergency contact information, so that the remote device may later initiate a call based on this emergency contact information. As a second example, the user input includes a desired association between one or more operations of the remote device and corresponding gesture(s), and the remote device creates this desired association.

At step 809, the remote device generates feedback on whether the remote device successfully performed the operation associated with the detected gesture, and then transmits this feedback to the mobile device. The associated operation may include, as a first example, adjusting a setting within a range of values. For example, the operation may be adjusting a temperature setting, and a corresponding feedback may include a variable feedback signal that varies based on the adjustment of the temperature setting. As a second example the associated operation may be to initiate an emergency call based on emergency contact information received from the user at step 801.

Referring again to FIG. 8B, flow continues at step 811, where the remote device wirelessly charges the mobile device's battery from a power source that is a component of the remote device. Flow then returns to step 802.

Figure 9:
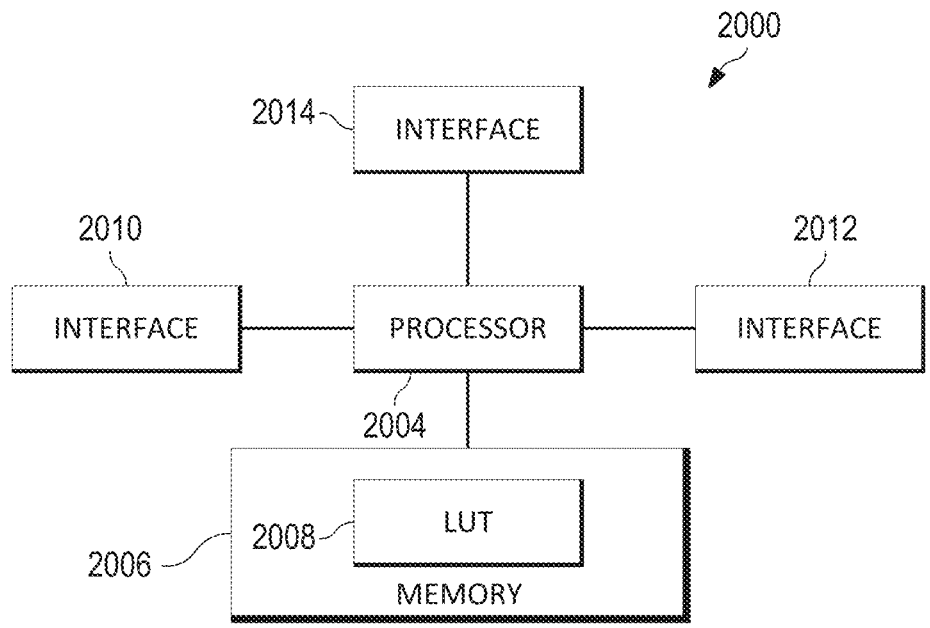
FIG. 9 is a block diagram illustrating a processing system for performing methods described, which may be installed in a host device in accordance with one of a number of embodiments.

FIG. 9 illustrates a block diagram of an embodiment processing system 2000 for performing methods described in this disclosure, which may be installed in a host device such as, e.g., the mobile device 106 or the remote device 104 of FIG. 1. As shown, the processing system 2000 includes a processor 2004, a memory 2006, and interfaces 2010-2014, which may (or may not) be arranged as shown in FIG. 9. The processor 2004 may be any component or collection of components adapted to perform computations and/or other processing related tasks, and the memory 2006 may be any component or collection of components adapted to store programming and/or instructions for execution by the processor 2004.

In an embodiment, the memory 2006 includes a non-transitory computer readable medium storing programming for execution by the processor 204. In an embodiment, this programming includes instructions to process a message received from an external mobile device. These instructions may allow the processor 204 to detect a gesture associated with an operation of the host device and then cause the host device to perform the operation based on this detected gesture. In an embodiment, this received message includes radar data, and the instructions to process the message include analyzing the frequency content of the radar data. In an embodiment, the memory 2006 includes an LUT 2008 storing pre-determined time domain radar signature(s) uniquely identifying one or more gesture(s) and associating each gesture with a respective operation of the remote device 106. In an embodiment, an operation of the host device that is associated with a gesture may include any of the following: turning on the host device, turning off the host device, setting a temperature setting of the host device, setting a fan setting of the host device, turning on a sound system of the host device, turning off the sound system, setting a volume setting of the sound system, selecting an input of the sound system, tuning a radio channel of the host device, opening a mechanical latch of the host device, turning on a light of the host device, turning off the light, setting a dimming setting of the light, changing a color of the light, turning on a user display of the host device, turning off the user display, changing visible content of the user display, setting a cruise control setting, auto-pilot program, or voice recognition program of the host device, mapping a route, looking up weather/road/traffic information, initiating a diagnostic test of the host device, enabling or disabling a security system of the host device, initiating a communications session, etc.

In the embodiment of FIG. 9, the LUT 2008 is included within the memory 2006, but in other embodiments the LUT 2008 may be implemented separately from the memory 2006. One or both of the LUT 2008 or the memory 2006 may be implemented in a Field Programmable Gate Array (FPGA), an Application Specific Integrated Circuit (ASIC), or other integrated circuit.

Referring again to FIG. 9, the interfaces 2010, 2012, 2014 may be any component or collection of components that allow the processing system 2000 to communicate with other devices/components and/or a user. For example, one or more of the interfaces 2010, 2012, 2014 may be adapted to communicate data, control, or management messages from the processor 2004 to applications installed on the host device and/or an external device. As another example, one or more of the interfaces 2010, 2012, 2014 may be adapted to allow a user or user device (e.g., personal computer (PC), etc.) to interact/communicate with the processing system 2000. The processing system 2000 may include additional components not depicted in FIG. 9, such as long term storage (e.g., non-volatile memory, etc.).

In some embodiments, the processing system 2000 is included in a network device that is accessing, or part otherwise of, a telecommunications network. In one example, the processing system 2000 is in a network-side device in a wireless or wireline telecommunications network, such as a base station, a relay station, a scheduler, a controller, a gateway, a router, an applications server, or any other device in the telecommunications network. In other embodiments, the processing system 2000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 10:
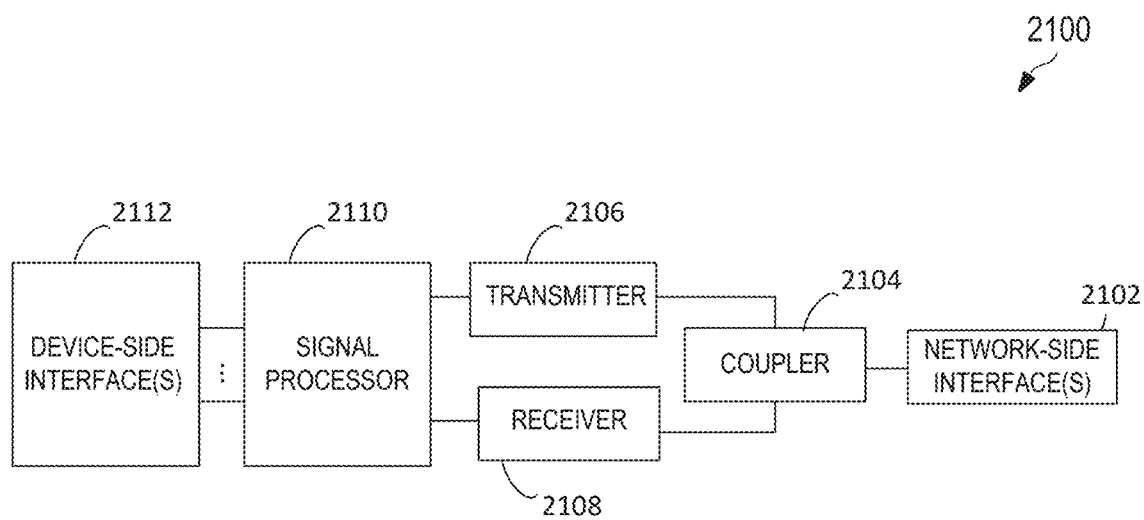
FIG. 10 illustrates a block diagram of a transceiver adapted to transmit and receive signaling over a telecommunications network in accordance with one of a number of embodiments.

In some embodiments, one or more of the interfaces 2010, 2012, 2014 connects the processing system 2000 to a transceiver adapted to transmit and receive signaling over the telecommunications network. FIG. 10 illustrates a block diagram of a transceiver 2100 adapted to transmit and receive signaling over a telecommunications network. The transceiver 2100 may be installed in a host device. As shown, the transceiver 2100 comprises a network-side interface 2102, a coupler 2104, a transmitter 2106, a receiver 2108, a signal processor 2110, and a device-side interface 2112. The network-side interface 2102 may include any component or collection of components adapted to transmit or receive signaling over a wireless or wireline telecommunications network. The coupler 2104 may include any component or collection of components adapted to facilitate bi-directional communication over the network-side interface 2102. The transmitter 2106 may include any component or collection of components (e.g., up-converter, power amplifier, etc.) adapted to convert a baseband signal into a modulated carrier signal suitable for transmission over the network-side interface 2102. The receiver 2108 may include any component or collection of components (e.g., down-converter, low noise amplifier, etc.) adapted to convert a carrier signal received over the network-side interface 2102 into a baseband signal. In an embodiment, the receiver 2108 is configured to receive, from an external mobile device, a message that includes radar data generated using millimeter wave radar signaling in a field of view of the mobile device. The signal processor 2110 may include any component or collection of components adapted to convert a baseband signal into a data signal suitable for communication over the device-side interface(s) 2112, or vice-versa. The device-side interface(s) 2112 may include any component or collection of components adapted to communicate data-signals between the signal processor 2110 and components within the host device (e.g., the processing system 2000, local area network (LAN) ports, etc.).

The transceiver 2100 may transmit and receive signaling over any type of communications medium. In some embodiments, the transceiver 2100 transmits and receives signaling over a wireless medium. For example, the transceiver 2100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2102 comprises one or more antenna/radiating elements. For example, the network-side interface 2102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Illustrative embodiments may use a remote device controlled by a mobile device that includes a radar-based gesture sensor having a small field of view relative to that of a gesture sensor located in the remote device. The merits of such embodiments may include preventing interfering gestures and other radar reflections from interfering with the correct detection of a target gesture.

The following additional example embodiments of the present invention are also provided. In accordance with a first example embodiment of the present invention, a method for operating a mobile device is provided. The method includes detecting a gesture by the mobile device. Detecting the gesture includes receiving a reflected millimeter wave signal by the mobile device, generating a first message in accordance with the detected gesture, and transmitting the first message from the mobile device to an external remote device. The detected gesture is associated with an operation of the remote device.

Also, the foregoing first example embodiment may be implemented to include one or more of the following additional features. The method may also be implemented such that detecting the gesture further includes transmitting, by the mobile device, a first millimeter wave signal to a location of the gesture. The reflected millimeter wave signal includes a reflection of the first millimeter wave signal reflected from the location of the gesture.

The method may also be implemented such that the gesture is located a distance of not greater than 30 centimeters from the mobile device. The method may also be implemented such that the mobile device includes at least one of a mobile phone, a watch, or a key for the remote device. The method may also be implemented further including wirelessly charging a battery of the mobile device, by the mobile device, from a power source of the remote device. The method may also be implemented such that the remote device includes a vehicle, and the mobile device includes at least one of a vehicle access key or a vehicle ignition key. The method may also be implemented such that the operation includes at least one of setting an air conditioning setting of the vehicle, setting a heat seating setting of the vehicle, opening a trunk of the vehicle, setting a lighting setting of the vehicle, or initiating an emergency call. The method may also be implemented such that the gesture includes a hand gesture. The method may also be implemented such that detecting the gesture further includes determining frequency content of the reflected millimeter wave signal, tracking the frequency content of the reflected millimeter wave signal over time, and comparing the tracked frequency content to a pre-determined gesture signature stored in a look-up table. The method may also be implemented such that the mobile device further includes a first antenna and a second antenna. Receiving the reflected millimeter wave signal includes receiving using the first antenna and transmitting the first message includes transmitting using the second antenna. The method may also be implemented such that the first antenna includes a receive antenna array and a transmit antenna array. The method may also be implemented such that transmitting the first message includes encrypting, by the mobile device, the first message using a shared security key of the mobile device and the remote device. The method may also be implemented further including receiving feedback, by the mobile device from the remote device, such that the feedback includes a status of whether the remote device successfully performed the operation associated with the gesture. The method may also be implemented further including generating, by the mobile device, a sound in accordance with the received feedback. The method may also be implemented such that the operation includes adjusting a temperature setting, the received feedback includes a variable feedback signal that varies in accordance with the adjusted temperature setting, and generating the sound includes adjusting the sound in accordance with the variable feedback signal. The method may also be implemented such that the first message includes at least one of radar timing information or radar frequency information.

In accordance with a second example embodiment of the present invention, a method for operating a first device is provided. The method includes receiving, by the first device from an external mobile device, a first message generated using millimeter wave radar signaling in a field of view of the mobile device. The method also includes processing, by the first device, the first message to detect a gesture associated with an operation of the first device, and performing, by the first device, an operation in accordance with the detected gesture.

Also, the foregoing second example embodiment may be implemented to include one or more of the following additional features. The method may also be implemented further including decrypting the first message, by the first device, in accordance with a shared security key of the mobile device and the first device. The method may also be implemented further including wirelessly charging the mobile device by a power source, such that the first device includes the power source. The method may also be implemented such that the first device includes a vehicle and the mobile device includes at least one of a vehicle access key or a vehicle ignition key.

The method may also be implemented such that the first message includes radar data. Processing the first message includes performing a spectral analysis of the radar data, tracking frequency content of the radar data over time based on the spectral analysis; and matching the tracked frequency content with a pre-determined gesture signature stored in a look-up table.

The method may also be implemented further including generating feedback including a status of whether the first device successfully performed the operation associated with the gesture and transmitting the feedback from the first device to the mobile device. The method may also be implemented such that performing the operation includes adjusting a temperature setting and the feedback includes a variable feedback signal that varies in accordance with the adjusted temperature setting. The method may also be implemented such that performing the operation includes initiating an emergency call. The method may also be implemented further including receiving, by the first device, a user input including emergency contact information, such that initiating the emergency call is in accordance with the emergency contact information. The method may also be implemented further including receiving, by the first device, user input including a desired operation of the first device to be associated with a desired gesture, and associating the desired operation with the desired gesture.

In accordance with a third example embodiment of the present invention, a control circuit for a first device is provided. The circuit includes a receiver configured to receive, from an external mobile device, a first message including radar data generated using millimeter wave radar signaling in a field of view of the mobile device. The circuit also includes a processor and a non-transitory computer readable medium storing programming for execution by the processor. The programming includes instructions to process the first message to detect a gesture associated with an operation of the first device, and to perform the operation of the first device in accordance with the detected gesture.

Also, the foregoing third example embodiment may be implemented to include one or more of the following additional features. The circuit may also be implemented further including a look-up table (LUT), such that the first message includes radar data. The instructions to process the first message include instructions to perform a spectral analysis of the radar data, track frequency content of the radar data over time based on the spectral analysis, and match the tracked frequency content with a pre-determined gesture signature stored in the LUT. The circuit may also be implemented such that the operation includes at least one of turning on the first device, turning off the first device, setting a temperature setting, setting a fan setting, turning on a sound system, turning off the sound system setting a volume setting of the sound system, selecting an input of the sound system, tuning a radio channel, opening a mechanical latch, turning on a light, turning off the light, setting a dimming setting of the light, changing a color of the light, turning on a user display, turning off the user display, changing visible content of the user display, setting a cruise control setting, turning on an auto-pilot program, turning off the auto-pilot program, turning on a voice recognition program, turning off the voice recognition program, mapping a route, looking up weather information, looking up information about a road condition, looking up information about traffic, initiating a diagnostic test, enabling a security system, disabling the security system, generating a sound, generating a haptic output, and initiating a communications session.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating a wireless access key, the method comprising:

detecting a gesture by the wireless access key, wherein the wireless access key is configured to unlock an external remote device and detecting the gesture comprises transmitting, by a first transmitter of the wireless access key, a first millimeter wave signal to a location of the gesture, and receiving a reflected millimeter wave signal by the wireless access key, wherein the reflected millimeter wave signal comprises a reflection of the first millimeter wave signal reflected from the location of the gesture;

generating a first message in accordance with the detected gesture, wherein the first message comprises radar data based on the received reflected millimeter wave signal, wherein the first message comprises at least one of radar timing information or radar frequency information; and wirelessly transmitting the first message from the wireless access key to the external remote device using a second transmitter different from the first transmitter, wherein the detected gesture is associated with an operation of the external remote device.

2. The method of claim 1, wherein:
the gesture is located a distance of not greater than 30 centimeters from the wireless access key.

3. The method of claim 1, further comprising:
wirelessly charging a battery of the wireless access key, by the wireless access key, from a power source of the external remote device.

4. The method of claim 1, wherein:
the gesture comprises a hand gesture.

5. The method of claim 1, wherein detecting the gesture further comprises:
determining frequency content of the reflected millimeter wave signal;
tracking the frequency content of the reflected millimeter wave signal over time; and
comparing the tracked frequency content to a pre-determined gesture signature stored in a look-up table.

6. The method of claim 1, wherein:
the wireless access key further comprises a first antenna and a second antenna;
receiving the reflected millimeter wave signal comprises receiving using the first antenna; and
transmitting the first message comprises transmitting using the second antenna.

7. The method of claim 6, wherein:
the first antenna comprises a receive antenna array and a transmit antenna array.

8. The method of claim 1, wherein:
transmitting the first message comprises encrypting, by the wireless access key, the first message using a shared security key of the wireless access key and the external remote device.

9. The method of claim 1, further comprising:
receiving feedback, by the wireless access key from the external remote device, wherein the feedback comprises a status of whether the external remote device successfully performed the operation associated with the gesture.

10. The method of claim 9, further comprising:
generating, by the wireless access key, a sound in accordance with the received feedback.

11. A method for operating an external remote device, the method comprising:
wirelessly receiving, by the external remote device from a wireless access key, a first message using a first wireless protocol, wherein the first message comprises radar data generated using a millimeter wave radar system of the wireless access key, wherein the first wireless protocol operates using signals different from radar signals of the millimeter wave radar system of the wireless access key;

processing, by the external remote device, the first message to detect a gesture associated with an operation of the external remote device; and performing, by the external remote device, the operation in accordance with the detected gesture.

12. The method of claim 11, further comprising:
decrypting the first message, by the external remote device, in accordance with a shared security key of the wireless access key and the external remote device.

13. The method of claim 11, further comprising:
wirelessly charging the wireless access key by a power source disposed within the external remote device.

14. The method of claim 11, wherein:
processing the first message comprises:
performing a spectral analysis of the radar data;
tracking frequency content of the radar data over time based on the spectral analysis; and
matching the tracked frequency content with a pre-determined gesture signature stored in a look-up table.

15. The method of claim 11, further comprising:
generating feedback comprising a status of whether the external remote device successfully performed the operation associated with the gesture; and
transmitting the feedback from the external remote device to the wireless access key.

16. The method of claim 11, further comprising:
receiving, by the external remote device, user input comprising a desired operation of the external remote device to be associated with a desired gesture; and
associating the desired operation with the desired gesture.

17. A control circuit for an external remote device, the control circuit comprising:
a wireless receiver configured to receive, from a wireless access key, a first message using a first wireless protocol, wherein the first message comprises radar data generated using a millimeter wave radar system of the wireless access key, wherein the first wireless protocol operates using signals different from radar signals of the millimeter wave radar system of the wireless access key;
a processor coupled to the wireless receiver;
a non-transitory computer readable medium storing programming for execution by the processor, the programming comprising instructions to:
process the first message to detect a gesture associated with an operation of the external remote device; and
perform the operation of the external remote device in accordance with the detected gesture.

18. The control circuit of claim 17, further comprising a look-up table (LUT), wherein:
the instructions to process the first message comprise instructions to:
perform a spectral analysis of the radar data;
track frequency content of the radar data over time based on the spectral analysis; and
match the tracked frequency content with a pre-determined gesture signature stored in the LUT.

19. The control circuit of claim 17, wherein the operation comprises at least one of:
turning on the external remote device turning off the external remote device, turning on a user display, turning off the user display, changing visible content of the user display, turning on a voice recognition program, turning off the voice recognition program, initiating a diagnostic test, enabling a security system, disabling the security system, generating a sound, generating a haptic output, and initiating a communications session.

20. A method for operating a wireless access key, the method comprising:
   detecting a gesture by the wireless access key, wherein the wireless access key is configured to unlock an external remote device and detecting the gesture comprises
   transmitting, by a first transmitter of the wireless access key, a first millimeter wave signal to a location of the gesture, and
   receiving a reflected millimeter wave signal by the wireless access key, wherein the reflected millimeter wave signal comprises a reflection of the first millimeter wave signal reflected from the location of the gesture;
   generating a first message in accordance with the detected gesture, wherein the first message comprises radar data based on the received reflected millimeter wave signal;
   wirelessly transmitting the first message from the wireless access key to the external remote device using a second transmitter different from the first transmitter; and
   wirelessly charging a battery of the wireless access key, by the wireless access key, from a power source of the external remote device,
   wherein the detected gesture is associated with an operation of the external remote device.

* * * * *